United States Patent
Dowd et al.

(10) Patent No.: US 11,555,574 B2
(45) Date of Patent: Jan. 17, 2023

(54) HEIGHT ADJUSTABLE MONITOR ARM MOUNTING ASSEMBLY

(71) Applicant: OmniMax USA, LLC, Anna, TX (US)

(72) Inventors: Paul Dowd, Scarsdale, NY (US); Bennet O. Poepping, Tuckahoe, NY (US)

(73) Assignee: OmniMax USA, LLC, Anna, TX (US)

( * ) Notice: Subject to any disclaimer, the term of this patent is extended or adjusted under 35 U.S.C. 154(b) by 0 days.

(21) Appl. No.: 16/879,043

(22) Filed: May 20, 2020

(65) Prior Publication Data
US 2021/0364122 A1 Nov. 25, 2021

(51) Int. Cl.
*F16M 11/04* (2006.01)
*F16M 11/16* (2006.01)
*F16M 11/18* (2006.01)

(52) U.S. Cl.
CPC ......... *F16M 11/046* (2013.01); *F16M 11/041* (2013.01); *F16M 11/045* (2013.01); *F16M 11/16* (2013.01); *F16M 11/18* (2013.01)

(58) Field of Classification Search
CPC .. F16M 11/046; F16M 11/041; F16M 11/045; F16M 11/16; F16M 11/18
USPC ...................... 248/243, 407–409, 125.3, 245
See application file for complete search history.

(56) References Cited

U.S. PATENT DOCUMENTS

| | | | | |
|---|---|---|---|---|
| 90,344 | A * | 5/1869 | Dare | B65B 67/12 248/125.3 |
| 1,732,081 | A * | 10/1929 | Clement | B25H 1/0007 269/84 |
| 6,017,009 | A * | 1/2000 | Swartz | A47B 57/10 248/245 |
| 6,863,252 | B2 * | 3/2005 | Bosson | F16M 11/041 248/278.1 |
| 8,398,049 | B2 * | 3/2013 | Lategan | F16M 11/08 248/125.7 |
| RE44,727 | E * | 1/2014 | Bosson | F16M 11/2014 248/278.1 |
| 2002/0011544 | A1 * | 1/2002 | Bosson | F16M 11/041 248/274.1 |
| 2002/0113180 | A1 * | 8/2002 | Wiebe | F16M 11/16 248/188 |
| 2015/0342351 | A1 * | 12/2015 | Hung | G09F 15/0087 211/26 |
| 2017/0261030 | A1 * | 9/2017 | Hung | F16M 11/08 |
| 2018/0094768 | A1 * | 4/2018 | Burke | F16M 11/2014 |
| 2020/0386367 | A1 * | 12/2020 | Hung | F16M 13/022 |

* cited by examiner

*Primary Examiner* — Christopher Garft
(74) *Attorney, Agent, or Firm* — Frank M. Scutch, III

(57) ABSTRACT

A height adjustable monitor arm assembly includes a monitor arm having a latch mechanism where a post arm includes indented rings therein for engaging the latch mechanism. The monitor arm includes an aperture for positioning the at least one monitor arm over the post arm so that the latching mechanism engages with one of the plurality of indented rings to vertically adjust the at least one monitor arm along the length of the post arm. Further, a dual adapter arm also includes its own latching mechanism and mounts over the vertical post arm for use where monitor displays can be mounted on both ends thereof. In one embodiment, a four monitor configuration can be held in position allowing for enhanced user utility in their workspace.

9 Claims, 4 Drawing Sheets

HEIGHT ADJUSTABLE MONITOR ARM MOUNTING ASSEMBLY

FIELD OF THE INVENTION

The present invention relates generally to electronic displays and monitors and more particular to a height adjustable monitor arm mounting assembly.

BACKGROUND OF THE INVENTION

Arms fastened to computer monitors and displays are well known in the art. These devices typically hold a monitor above a desk top and provide some angular adjustment so the user can better see the display. In order to prevent fatigue, user's typically want to view a monitor at eye level. One problem with current monitor arms is it that they are not easily vertically adjusted. The user can view the monitor only by tilting their head by looking up or down. This causes muscle strain over long periods of time.

Although some monitor mounts allow a vertical adjustment with a 4-bar linkage and gas spring, the gas spring is difficult adjust correctly. Moreover the gas spring is often unable to reliably support the monitor after some amount of time. Other systems are vertically fixed with a clamp or set screw, and require a tool loosen and tighten the device. This makes it difficult to adjust height due to the weight hanging off the arm and typically requires a great deal of force and/or friction to prevent slippage.

Accordingly, new solutions are required to adjust monitor viewing angle and height allowing the user a great comfort and ease of use.

SUMMARY OF THE INVENTION

A height adjustable monitor arm assembly includes a vertical post arm having at least one indented ring formed thereon. At least one monitor arm has an aperture for mounting over the post arm. The at least one monitor arm includes a latch mechanism therein for engaging with the at least one indented ring to hold the at least one monitor arm in a fixed position along the length of the vertical post arm. The assembly includes an actuator configured within the at least one monitor arm for operating a resilient member allowing the at least one monitor arm to be disengaged from the at least one indented ring. The at least one monitor arm is comprised with a proximal arm for attachment to the vertical arm post and a distal arm for connecting to a monitor where the distal arm includes at least one hinge for allowing the monitor to be horizontally adjusted.

The assembly may also include a dual adapter arm having an aperture for mounting to the vertical post arm where the dual adapter arm includes a latch mechanism therein for engaging with the at least one indented ring to hold the dual adapter arm in a fixed position along the length of the vertical post arm. The dual adapter arm includes at least one actuator configured within the dual adapter arm for operating a resistant member allowing the dual adapter arm to be disengaged from the at least one indented ring.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
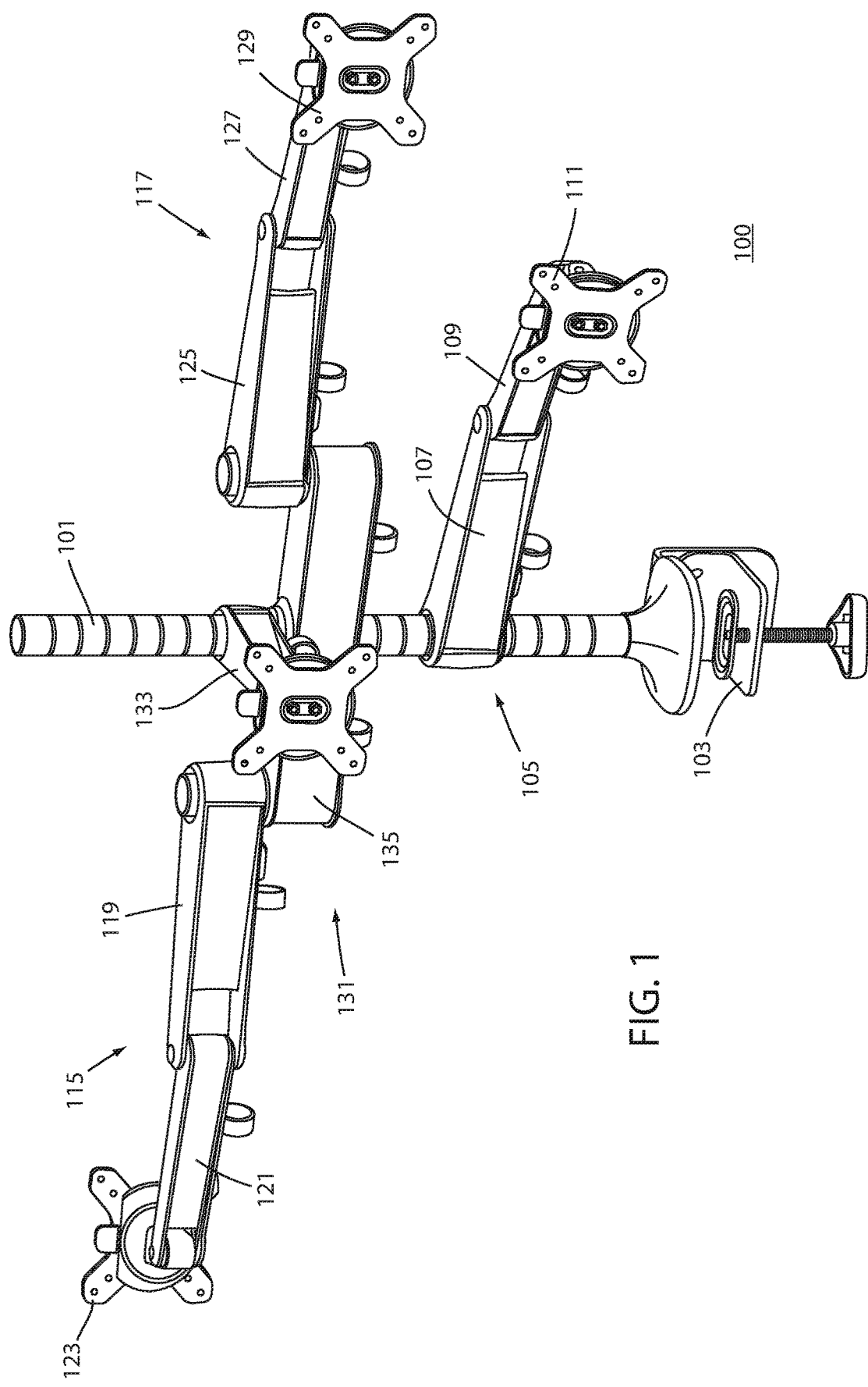
FIG. 1 is a perspective view of a height adjustable monitor arm mounting assembly for holding three monitors each having adjustable height.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a height adjustable monitor arm. Those skilled in the art will recognize that a monitor arm may be used with a computer, television and/or other video apparatus. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 is a perspective view of a height adjustable monitor arm mounting assembly for holding three monitors each having adjustable height. Those skilled in the art will recognize the term "monitor" to mean an electronic visual display device that includes a screen and operational circuitry. The monitor may include but is not limited to a computer monitor display, television monitor or other electronic display device. As seen in FIG. 1, the monitor arm assembly 100 includes a post arm 101 that is cylindrical in shape having a plurality of indented rings formed at predetermined positions along the entire length of its body. Each indented ring is smaller in diameter than the body of the post arm 101. Hence, each ring has an inner diameter that is smaller in size than the outer diameter of the post arm 101. Although indented rings are used in this embodiment to secure the monitor arm(s), other mounting structures and methods are also possible e.g. rings or other protrusions having a diameter greater than that of the post arm 101. At one end, the post arm 101 uses a mounting clamp for securing the post arm 101 to the surface of a desk, table or other flat surface. As seen in FIG. 1, this embodiment uses two different types of monitor arms attached to the post arm 101 for example, one using a distal arm and one without a distal arm.

In order to hold a single monitor to the post arm 101, a single monitor arm 105 is formed using a proximal arm 107 jointed to a distal arm 109. As will be described herein, a hole, opening or aperture is formed in the proximal arm 107 slides over and end of the post arm 101 so that it be adjustably positioned along the length of the post arm 101 at any desired location. In an alternative, embodiment, the aperture can be opened and clipped on from the side of the post arm. The distal arm 109 is adjustably fastened at one end to the proximal arm 107 where its opposite end has a monitor mount 111 for attachment to the rear housing of a video monitor. Although the monitor mount 111 is shown here having a standardized star-like configuration, those skilled in the art will recognize that other configurations of monitor mount are also possible. As will be described herein, the monitor arm 105 is vertically adjustable allowing the user to easily adjust its height on the post arm 101 above a desk or table top.

Further, other configurations allow two or more monitors to be attached along the post arm 101. More specifically a dual adapter arm 113 has an aperture centrally located in its body. The aperture slides over one end of the post arm 101 where the sides of the dual adapter arm 113 are both accessible. In one embodiment, a left monitor arm 115 is attached to the left side of the dual adapter arm 113 while a right monitor arm 117 attaches to the right side of the dual adapter arm 113. As noted with regard to the monitor arm 105, the dual adapter arm 113 slides over the top of the post arm 101 at one end, where its height can be adjusted anywhere along the length of the post arm 101. The dual adapter arm 113 includes a left proximal arm 119, left distal arm 121 and monitor mount 123. Similarly, the dual monitor arm 117 is comprised of a right proximal arm 125, right distal arm 127 and monitor mount 129. The pivotal nature of each of the monitor arms allows a monitor screen to be easily adjusted for desired viewing angles. Those skilled in the art will further recognize that in order to reduce cost, the dual adapter arm 113 can use the same components as the single monitor arm 105.

Finally, in situations where multiple monitors are required, a triple-add arm 131 can be used. The triple-add arm 131 is comprised of a proximal arm 133 mounted directly to a monitor mount 135. The triple-add arm 131 is short having no distal arm attached thereto. The triple-add arm 131 also slides over the top of the post arm 101 at one end where it can be positioned directly above the dual adapter arm 113. The triple-add arm 131 derives its name from situations where three monitors are required to be positioned together laterally, in a row, across the body of the dual adapter arm 113.

Figure 2:
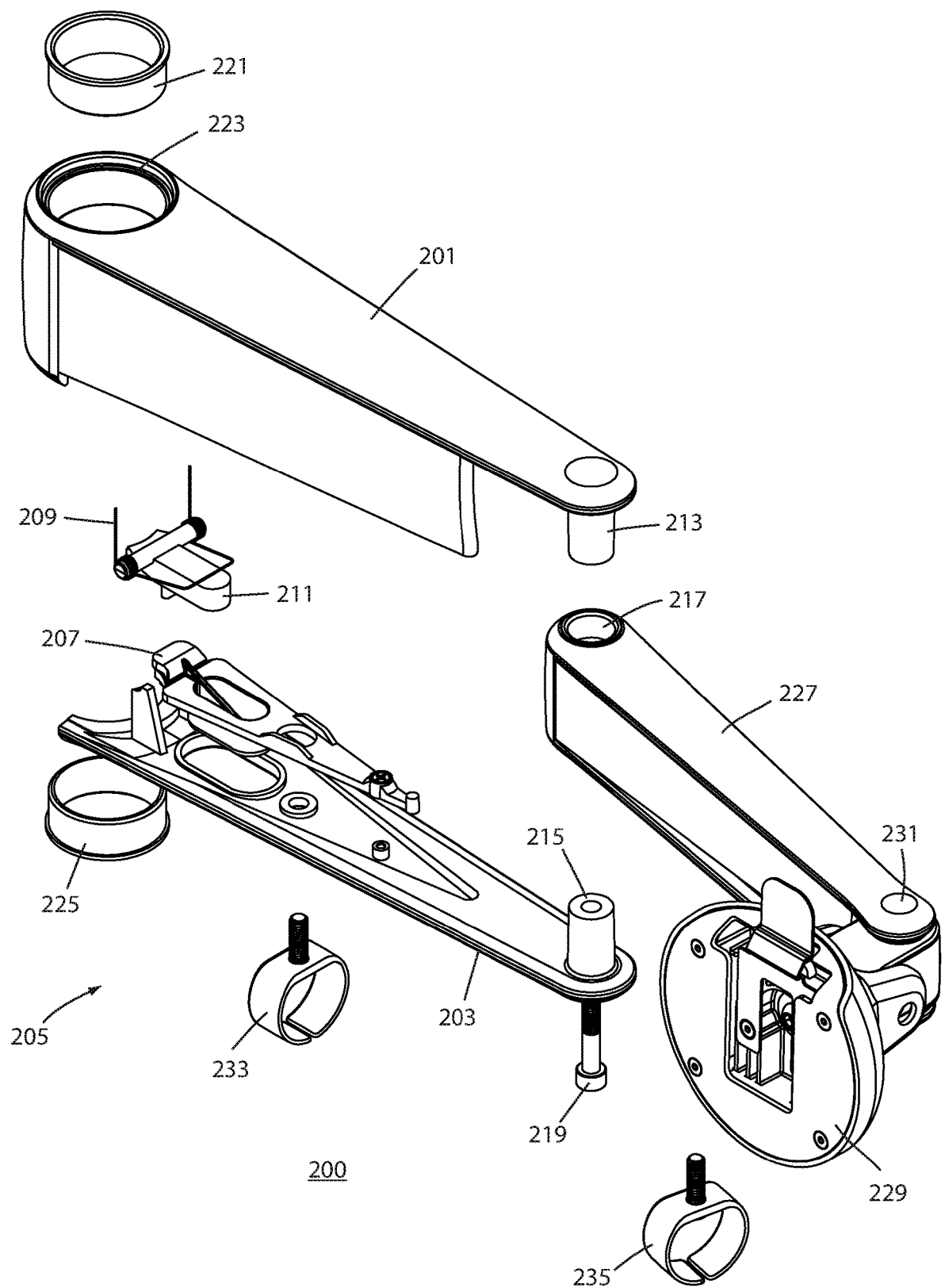
FIG. 2 is an exploded view of a single monitor arm according to an embodiment of the invention.

FIG. 2 is an exploded view of a single monitor arm according to an embodiment of the invention. The single monitor arm 200 is comprised of an upper housing 201 and a lower housing 203. The combination of the upper housing 201 and lower housing 203, when joined together, form the proximal arm 205. Mounted within the lower housing 203, is a latch mechanism 207. The latch mechanism 207 uses a spring lever 209 that provides a resilient force. An aperture in the lower housing exposes an actuator such as a button 211 that uses a resilient member such as a spring 213 to release the latch 215. Those skilled in the art will recognize that the latch mechanism 207 pivots by engaging one of the indented rings in the post arm to hold the proximal arm 205 in a fixed position. When the upper housing 201 and the lower housing 203 are joined, an upper spacer 213 and lower spacer 215 are joined though aperture 217 using a screw or other fastener 219. An upper grommet 221 and lower grommet 223 are also joined together allowing wire and/or cable to pass though the interior of the proximal arm 205. The distal arm 227 connects to the proximal arm 205 using the upper spacer 213 and/or lower spacer 215. A monitor mount 229 connects to the distal arm 227 using a hinge 231. Finally, cable fasteners 233, 235 are attached under the lower housing 203 allowing wires and cables to be routed to an attached monitor. Thus the single monitor arm can be adjusted bother vertically and horizontally allowing the user to position a monitor in practically any desired position.

Figure 3:
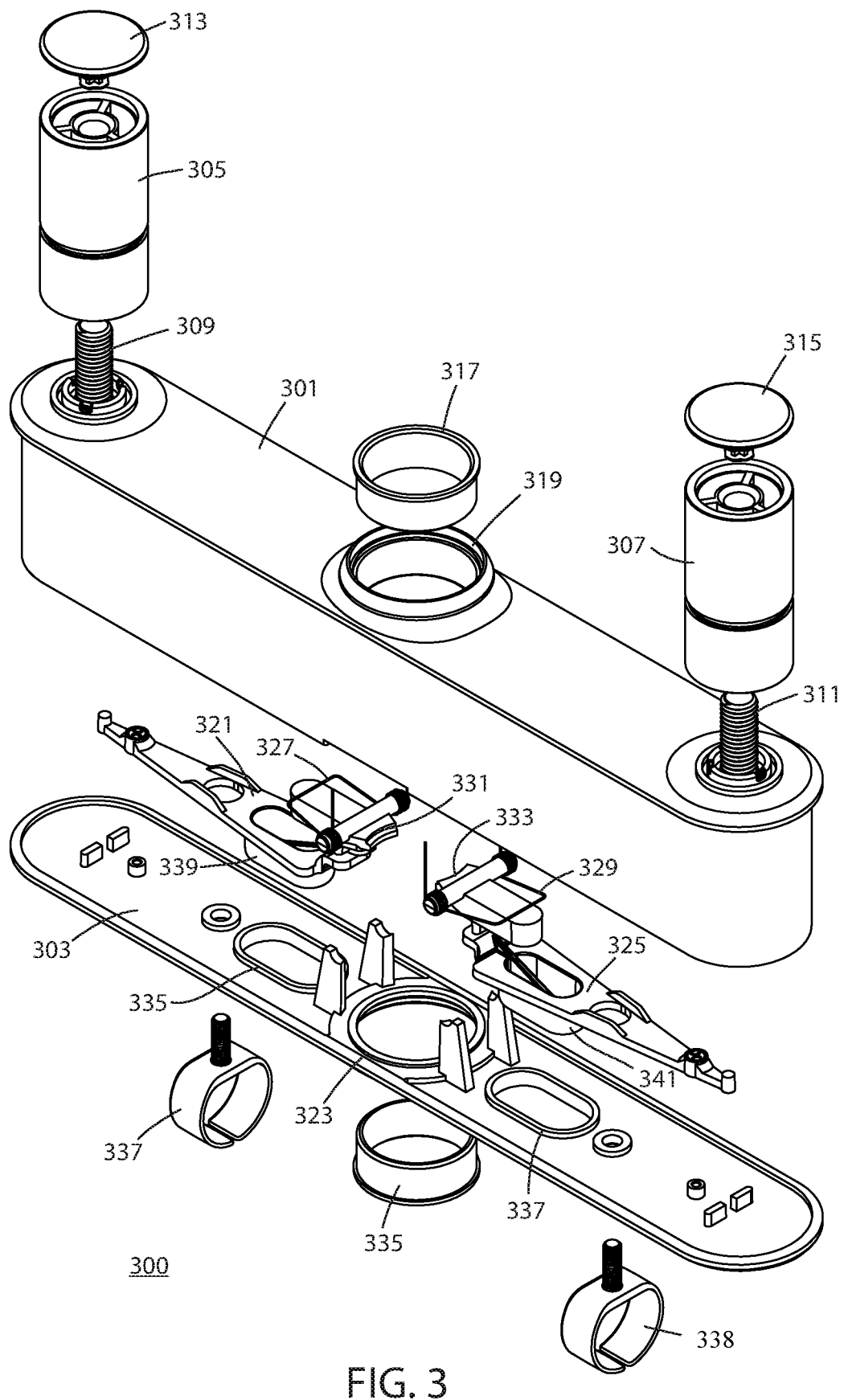
FIG. 3 is an exploded view of a dual adapter allowing the arm to hold two-monitors.

FIG. 3 is an exploded view of a dual adapter arm allowing the arm to hold two-monitors or other display devices. The dual adapter arm 300 includes an upper adapter housing 301 and lower adapter housing 303. The upper adapter housing 301 includes a first spacer 305 and second spacer 307 that is engaged with respective threaded studs 309, 311 extending upwardly from the upper adapter housing 301. The spacers 305, 307 each have end caps 313, 315 for covering the interior of the respective spacer. As seen in FIG. 1, the first spacer 305 and second spacer 307 fit within a respective aperture in the proximal arm. A bushing or grommet 317 fits within the aperture 319 that is used for routing cable and wire though the dual adapter arm 300.

The lower adapter housing 303 uses a plurality of latch mechanisms for engaging the indented rings in the post arm. Two latch mechanisms are provided to provide a greater hold when the dual adapter arm 300 is supporting two or three monitors. A first latch mechanism 321 is provided to the left of an aperture 323 while a second latch mechanism 325 is provided to the right the aperture 323. The first latch mechanism 321 and second latch mechanism 325 both include respective spring levers 327, 329 that use a latch 331, 333 to engage the post arm. The spring levers 327, 329 must be pushed or engaged with force to overcome their resilient members therein. Apertures 335, 337 in the lower adapter housing 303 expose buttons 339, 341 that use the respective spring levers 327, 329 to release the respective latch 331, 333. Those skilled in the art will recognize that the first latch mechanism 321 and second latch mechanism 325 both independently pivot and hold the dual adapter arm in a fixed position by engaging the indented rings in the post arm. Finally, a grommet 335 partially fills the aperture 323 for use in routing wire and cable where cable fasteners 337 and 338 hold the cable securely under the lower adapter housing 303.

Figure 4A:
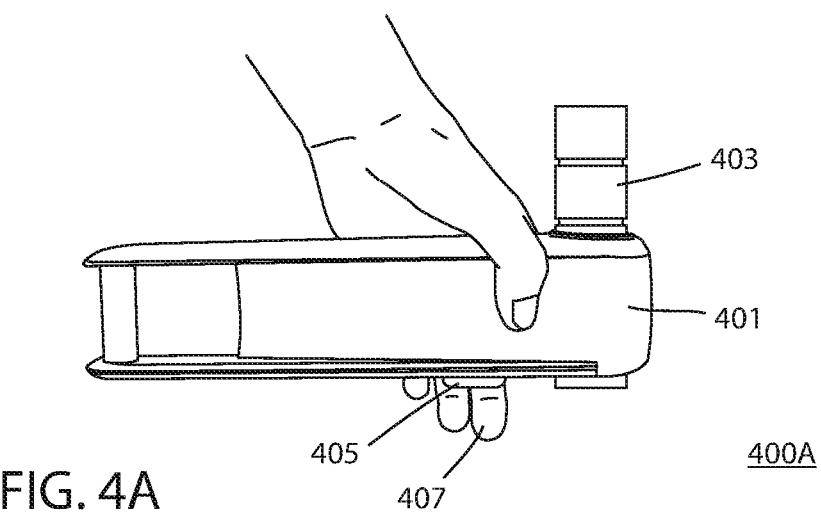
FIG. 4A, FIG. 4B and FIG. 4C are illustrations of the monitor arm moving between a raised and lowered position.
Figure 4B:
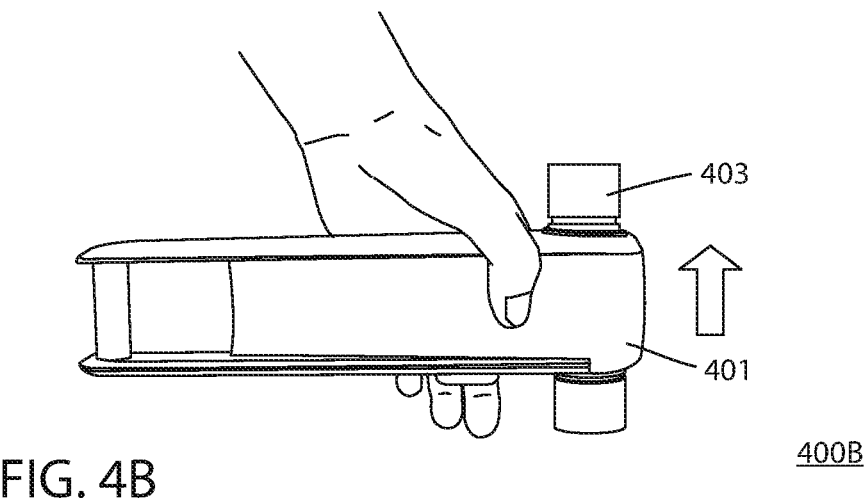
Figure 4C:
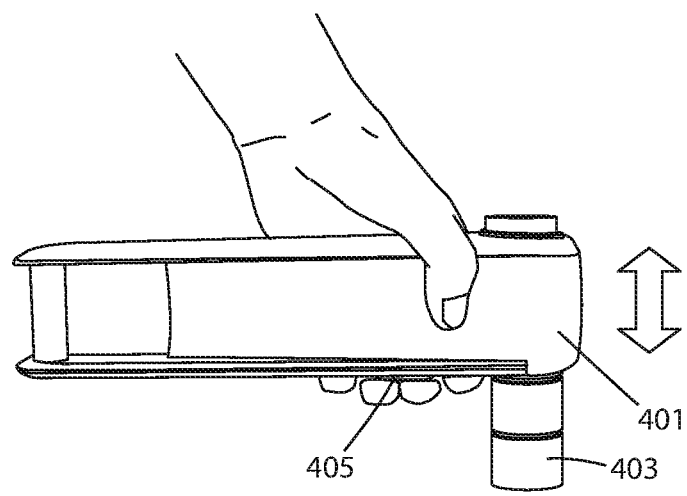

FIG. 4A, FIG. 4B and FIG. 4C are illustrations of the monitor arm moving between raised and lowered positions along the length of the post arm. FIG. 4A illustrates a monitor arm 401 positioned substantially low on the a post arm 403. When the user wishes to raise monitor arm 401 to a higher level, the user will engage an actuator such as a button 405 with their finger 407. As described with regard to both FIG. 2 and FIG. 3, the button disengages the latch from the indented ring in the post arm 403 allowing the monitor arm to move freely. FIG. 4B illustrates the monitor arm 401 being raised upwardly along the post arm 403 so a monitor can be adjusted to a higher viewing level. Finally, FIG. 4C illustrates the monitor arm 401 at a final raised position along the post arm 403 where the user can release the button 405 to reengage the latch to an indented ring.

Thus, the present invention is directed to a height adjustable video monitor arm mounting assembly that includes one or more single monitor arms as well as a dual adapter arm whose height is adjustable along the length of a post arm that is fastened vertically to a desk or table top. In one embodiment, the mounting assembly can hold four monitors that are all vertically and horizontally adjustable offering a user a high degree utility in viewing multiple monitors in their workspace.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A height adjustable monitor arm assembly comprising:
a vertical post arm having at least one indented ring formed thereon;
a proximal monitor arm formed using an upper housing and lower housing and having an aperture configured therein for mounting over the post arm;
a distal monitor arm attached to the proximal monitor arm for attaching to a display monitor;
an actuator having a user operable button extending under the proximal monitor arm for operating a latch mechanism, such that the latch mechanism includes a levered arm having a tab at one end, where the user operable button is pressed to push the tab of the levered arm causing the latch mechanism to move away from the post arm, the latch member having an arc shaped tooth at one end; and
wherein the arc shaped tooth engages within the at least one indented ring to hold the proximal monitor arm in a fixed position along the length of the vertical post arm.

2. A height adjustable monitor arm assembly as in claim 1, wherein the distal monitor arm includes at least one hinge for allowing the monitor display to horizontally adjusted.

3. A height adjustable monitor arm assembly comprising:
at least one monitor arm formed from a proximal monitor arm and a distal monitor arm such that the proximal monitor arm is pivotably connected to the distal monitor arm;
a post arm having a plurality of indented rings therein;
an actuator having a button extending under the proximal monitor arm for operating a latch mechanism, the latch mechanism having a levered arm with a tab at one end, where the the button is pressed to push the tab causing the latch mechanism to move away from the post arm, the latch member biased by a resilient member and having an arc shaped tooth at one end for allowing the at least one monitor arm to be disengaged from one of the plurality of indented rings; and
wherein the proximal monitor arm includes an aperture for positioning the proximal monitor arm over the post arm so that the arch shaped tooth engages with one of the plurality of indented rings to vertically adjust the at least one monitor arm along the length of the post arm.

4. A height adjustable monitor arm assembly as in claim 3, wherein the distal monitor arm includes at least one hinge for allowing a monitor display to horizontally adjusted.

5. A height adjustable monitor arm assembly as in claim 3, further comprising:
a dual adapter arm having an aperture for mounting over the post arm for use in mounting monitors on both ends thereof, where the dual adapter arm includes at least one latch mechanism therein for engaging with one of the plurality of indented rings to hold the dual adapter arm in a fixed position along the length of the post arm.

6. A height adjustable video monitor arm assembly comprising:
a post arm having a plurality of indented rings and mounted vertically from a table surface;
a first monitor arm having an aperture for mounting the first monitor arm over the post arm;
a second monitor arm having an aperture for mounting the second monitor arm over the post arm;
a dual monitor arm having an aperture for mounting the second monitor arm over the post arm; and
wherein each of the first monitor arm, second monitor arm and dual monitor arm includes at least one latch mechanism for engaging with one of the plurality of indented rings for holding the first monitor arm, second monitor arm and dual monitor arm in a fixed position along the length of the post arm, and where an actuator includes a button configured under each of the first monitor arm, second monitor arm and dual monitor arm for operating the at least one latch mechanism, the at least one latch mechanism includes a levered arm having a tab at one end, where the button is pressed to push the tab causing the at least one latch mechanism to move away from the post arm, the latch mechanism is moveable and is biased by a resilient member, the latch mechanism having an arc shaped tooth at one end for allowing the first monitor arm, second monitor arm and dual monitor arm to be disengaged from the at least one indented ring to adjust its position on the post arm.

7. A height adjustable video monitor arm assembly as in claim 6, wherein the first monitor arm is comprised with a proximal arm for attachment to the vertical arm post and a distal arm for connecting to a monitor.

8. A height adjustable video monitor arm assembly as in claim 7, wherein the distal arm includes at least one hinge for allowing the computer monitor to horizontally adjusted.

9. A height adjustable video monitor arm assembly as in claim 8, wherein the distal arm includes a monitor mount for use in mounting to the back of a monitor housing.

* * * * *